(12) United States Patent
Ransil

(10) Patent No.: US 6,422,372 B2
(45) Date of Patent: Jul. 23, 2002

(54) ROLLER CONVEYING APPARATUS

(75) Inventor: Matthew J. Ransil, Lancaster, PA (US)

(73) Assignee: Morgan Corporation, Morgantown, PA (US)

( * ) Notice: Subject to any disclaimer, the term of this patent is extended or adjusted under 35 U.S.C. 154(b) by 0 days.

(21) Appl. No.: 09/775,957

(22) Filed: Feb. 2, 2001

Related U.S. Application Data
(60) Provisional application No. 60/185,238, filed on Feb. 28, 2000.

(51) Int. Cl.$^7$ ............................................... B65G 13/00
(52) U.S. Cl. ............................ 193/35 SS; 193/35 R; 198/782
(58) Field of Search ......................... 193/35 SS, 35 R; 198/782

(56) References Cited

U.S. PATENT DOCUMENTS

| | | | |
|---|---|---|---|
| 3,439,790 A | | 4/1969 | Langley et al. |
| 3,958,701 A | | 5/1976 | Yatagai et al. |
| 4,036,345 A | * | 7/1977 | Webb ..................... 193/35 SS |
| 4,089,399 A | * | 5/1978 | Webb ..................... 193/35 SS |
| 4,498,384 A | * | 2/1985 | Murphy ...................... 100/224 |
| 4,549,844 A | * | 10/1985 | Miller ........................ 414/534 |
| 4,593,810 A | * | 6/1986 | Cook ......................... 198/781 |
| 4,750,604 A | * | 6/1988 | Cook ....................... 198/468.6 |
| 4,819,554 A | * | 4/1989 | Fleischer et al. ........... 100/224 |
| 4,909,372 A | * | 3/1990 | Jones ..................... 193/35 SS |
| 4,909,378 A | * | 3/1990 | Webb .......................... 198/721 |
| 5,123,517 A | * | 6/1992 | Windau .................... 198/463.3 |
| 5,947,676 A | * | 9/1999 | Richard ....................... 414/535 |

FOREIGN PATENT DOCUMENTS
EP 0 304 527 A1 3/1989

\* cited by examiner

Primary Examiner—Christopher P. Ellis
Assistant Examiner—Rashmi Sharma
(74) Attorney, Agent, or Firm—Carella, Byne, Bain, Gilfillan, Cecchi, Stewart & Olstein; Elliot M. Olstein; William Squire

(57) ABSTRACT

A track assembly comprises an inner channel member, an outer channel member and a top plate, through which load bearing rollers selectively protrude An inflatable air bag is between the inner and outer channels for raising and lowering the inner channel. The rollers are attached to the inner channel and are raised and lowered to a recessed state as the air bag raises and lowers the inner channel. An air line fitting at one air bag end passes through the outer channel member side wall to fix the air bag end longitudinally in place. The other end is clamped by two plates sandwiching the air bag end therebetween. One of the clamp plates has two opposing tabs extending therefrom and which engage mating slots in the side walls of the outer channel. As the bag inflates and deflates, the clamp tabs permit the air bag end to ride up and down vertically wherein the tabs ride up and down in the slots. This keeps the bag end longitudinally in place without adding additional fixation components. The tabs and slots are arranged to preclude binding of the tabs as the bag is moved.

8 Claims, 3 Drawing Sheets

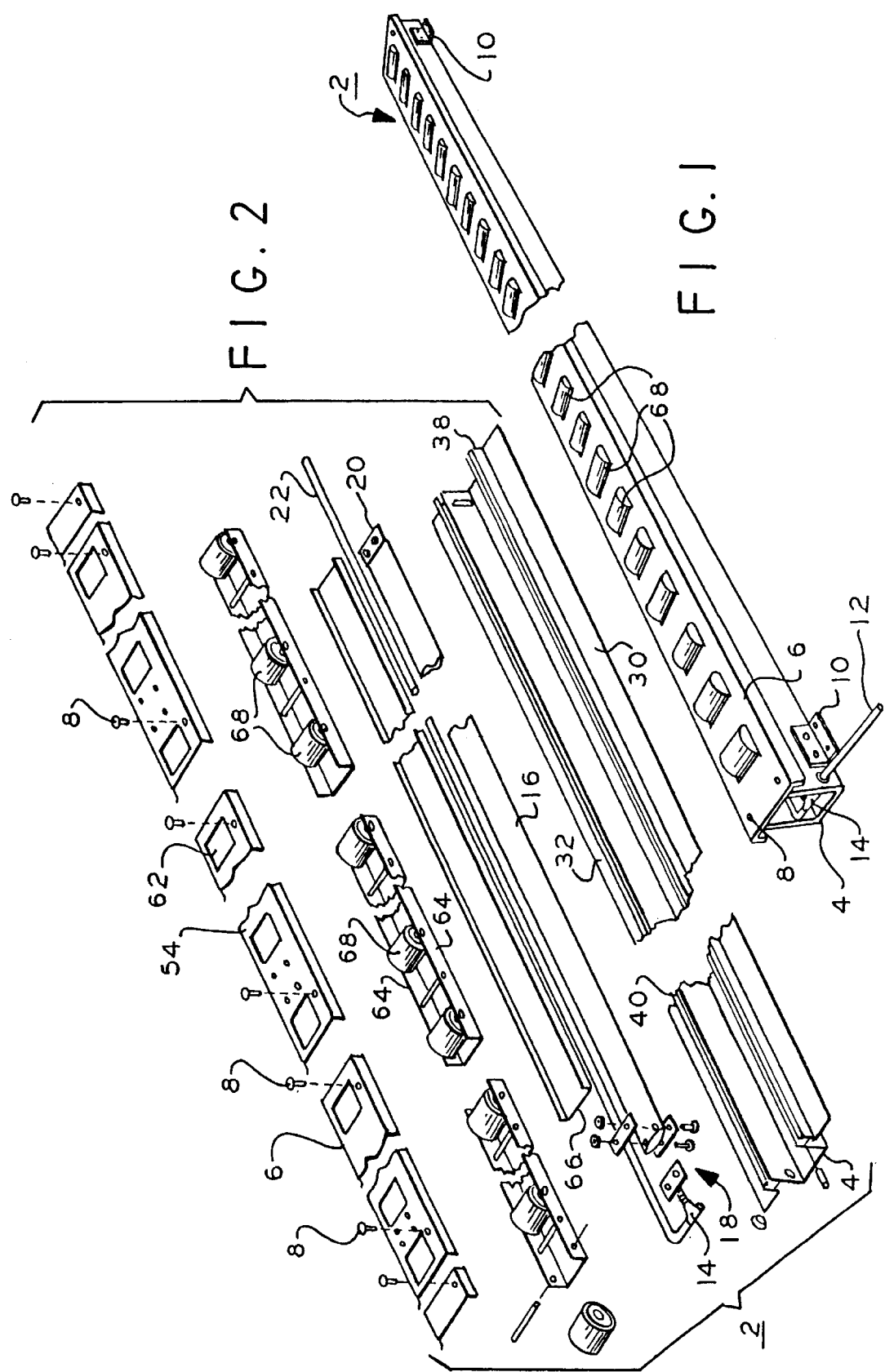

ROLLER CONVEYING APPARATUS

This application claims benefit of provisional No. 60/185,238 filed Feb. 28, 2000.

This invention relates to roller track conveying apparatus for conveying cargo loads.

Of interest are U.S. Pat. Nos. 4,909,378, 4,750,604, 4,909,372, 4,036,345 and 4,089,399 all incorporated by reference herein.

These patents relate to roller track mechanical handling systems in which an outer elongated channel receives an elongated inflatable air bag along the channel length. The air bag is supplied with pressurized air to selectively inflate or deflate the bag. A second inner elongated channel is nested within the outer channel. A series array of rollers are rotatably secured to the inner channel and are aligned with openings in a top plate secured over the outer channel. The inner channel rests on the air bag and is raised and lowered within the outer channel as the air bag is inflated and deflated. This raises the rollers to an exposed operative position extending above the top plate to receive cargo to be displaced. When the bag is deflated, the rollers are recessed into the outer channel below the top plate permitting the cargo to rest on the top plate of the assembly and become relatively difficult to displace and stationary due to high frictional resistance with the plate. A pressurized air line is coupled to the end track air bag to selectively pressurize and deflate the air bags.

Typically, a series of such tracks are installed end to end to form a continuous linear track. A fitting is connected to the end air bag to receive a pressurized inlet air line from a pressurized air source and also to supply pressurized air to a further air line which feeds pressurized air to the immediate aligned next adjacent track via fittings coupled to each air bag. In similar fashion, a further air line feeds air to the next successive one of the series of aligned tracks.

The air bag is clamped by one clamp at the air inlet region and includes a fitting attached to the air bag by the clamp. The fitting extends outside the outer channel to receive the inlet pressurized air. The bag is long and the other end is also clamped, e.g., by two plates that are bolted together and has no air fitting. This clamped end is free to move about in any direction and may at times displace longitudinally which is undesirable. The problem with this arrangement is that the free end of the air bag with only a clamp tends to fold over onto itself because the deflated bag is flat. This fold over condition interferes with operation of the air bag during inflation. Also, the folds tend to become fatigued due to the inflation and deflation cycles.

In a another arrangement of the prior art, the end without the fitting is attached to the top plate by a vertical bar that is fixed to the top plate and to the air bag clamp. This structure involves additional parts which add difficulty for the assembly process and thus also add cost.

These problems are solved by the present invention.

A roller conveying apparatus according to the present invention comprises an outer channel member having a bottom wall and two opposing side walls forming an elongated receptacle; a top plate secured to the outer channel member side walls for enclosing the receptacle, the top plate having a plurality of openings there through; an inner channel member having a bottom wall and forming an elongated inner channel, the inner channel member being disposed in the receptacle; a plurality of rollers for vertically supporting a cargo load and rotatably secured to the inner channel member in the inner channel, each roller corresponding to a roller receiving opening in the top plate; an elongated inflatable air bag in the receptacle disposed between and for engagement with the outer channel member bottom wall and the inner channel member bottom wall, the air bag when inflated for displacing the inner channel member in a vertical direction to move the rollers through the corresponding openings and when deflated for permitting displacement of the inner channel member to recess the rollers into the inner channel member channel, the air bag having first and second opposing ends and being arranged to receive pressurized air to inflate the bag; a clamp at one of the air bag ends for sealing the air bag one end, the clamp for displacing in the receptacle in response to the inflation and deflation of the air bag; and guide means for guiding the clamp during the clamp displacement.

In one aspect, the guide means comprises cooperating means coupled to the clamp and outer channel member arranged to permit only vertical displacement of the clamp in the receptacle.

In a further aspect, the outer channel member side walls each have a slot, the clamp comprising at least one member for fluid sealing the air bag one end, the at least one member having opposing first and second ends, the at least one member first and second ends each including a tab for engaging and mating with the slot in a corresponding different outer channel member side wall.

In a further aspect, the slots are oriented vertically in the corresponding outer channel member side wall, the tab for traversing the mating slot vertically.

In a still further aspect, the clamp comprises a pair of plates fastened together, each plate having opposing ends and lying in a plane, the guide means including a tab extending from at least one end of at least one of the plates, at least one outer channel member side wall having a slot for receiving the tab to permit the clamp to displace vertically in response to inflation and deflation of the air bag while precluding horizontal displacement of the bag one end.

In a further aspect, the guide means is arranged to prevent horizontal displacement of the air bag one end.

In a further aspect, the guide means comprises matingly engaged means coupled to the clamp and outer channel member for permitting vertical displacement while precluding horizontal displacement of the air bag one end.

Preferably, the guide means comprises a tab on the clamp and a mating slot for receiving the tab in a side wall of the outer channel member.

In a further aspect, the clamped end opposite the end with the fitting comprises two plates one of which has opposing end tabs. The outer channel has mirror image aligned vertical slots in the opposing side walls for receiving the tabs, a tab being located in a corresponding slot. In this way the clamped end can ride up and down vertically with the air bag as it is inflated and deflated, minimizing damage to the air bag, while at the same time keeping the bag end in fixed axial position in the outer channel with a minimum of parts.

IN THE DRAWING

FIG. 1 is a perspective view of a roller track assembly according to the present invention;

FIG. 2 is an exploded view of the assembly of FIG. 1;

FIG. 3 is a cross sectional end elevation view of the track of FIG. 1 according to one embodiment;

FIG. 4 is a plan view of a series of similar tracks as shown in FIG. 1 aligned in a linear array as used in a typical commercial application.

Figures 3, 4:
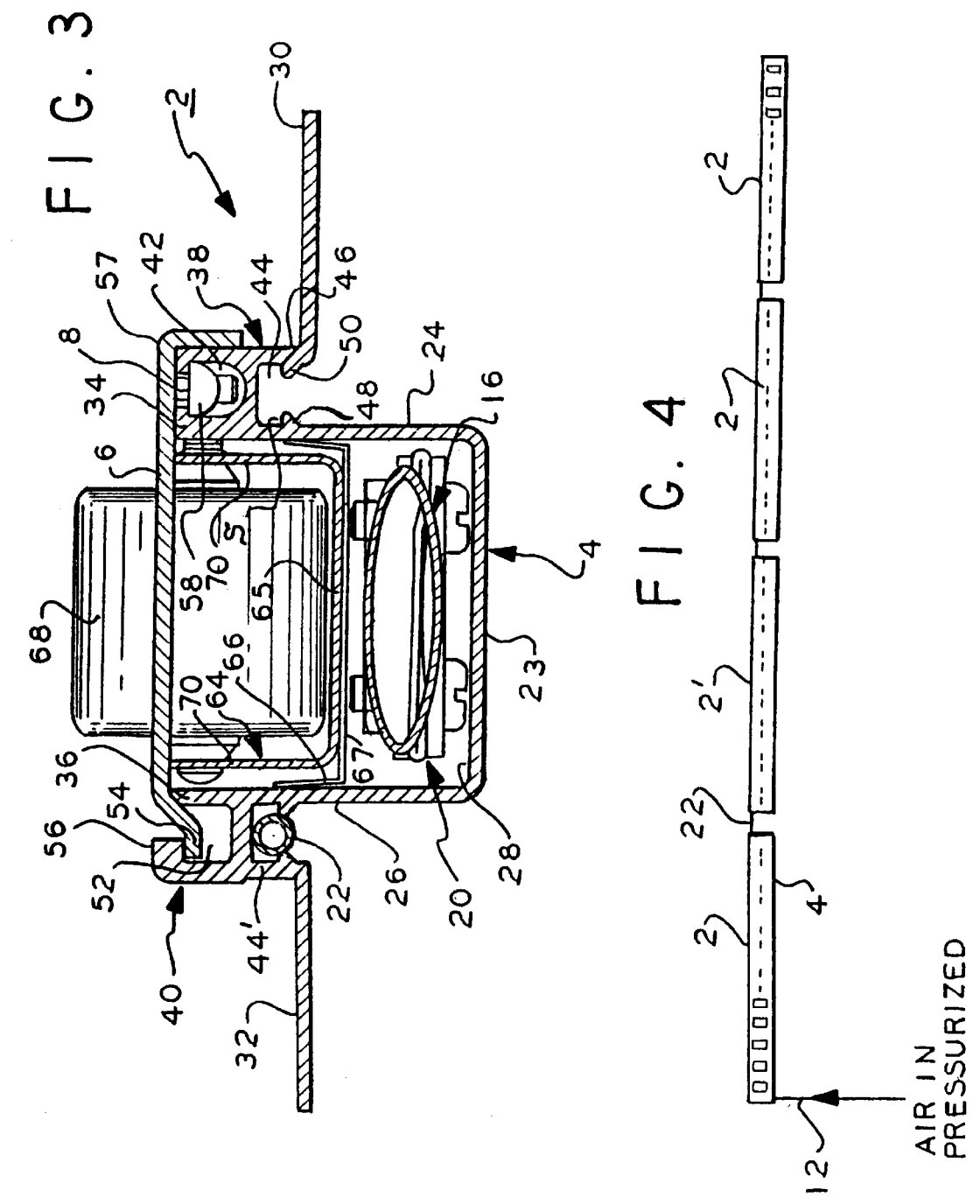
Figure 5:
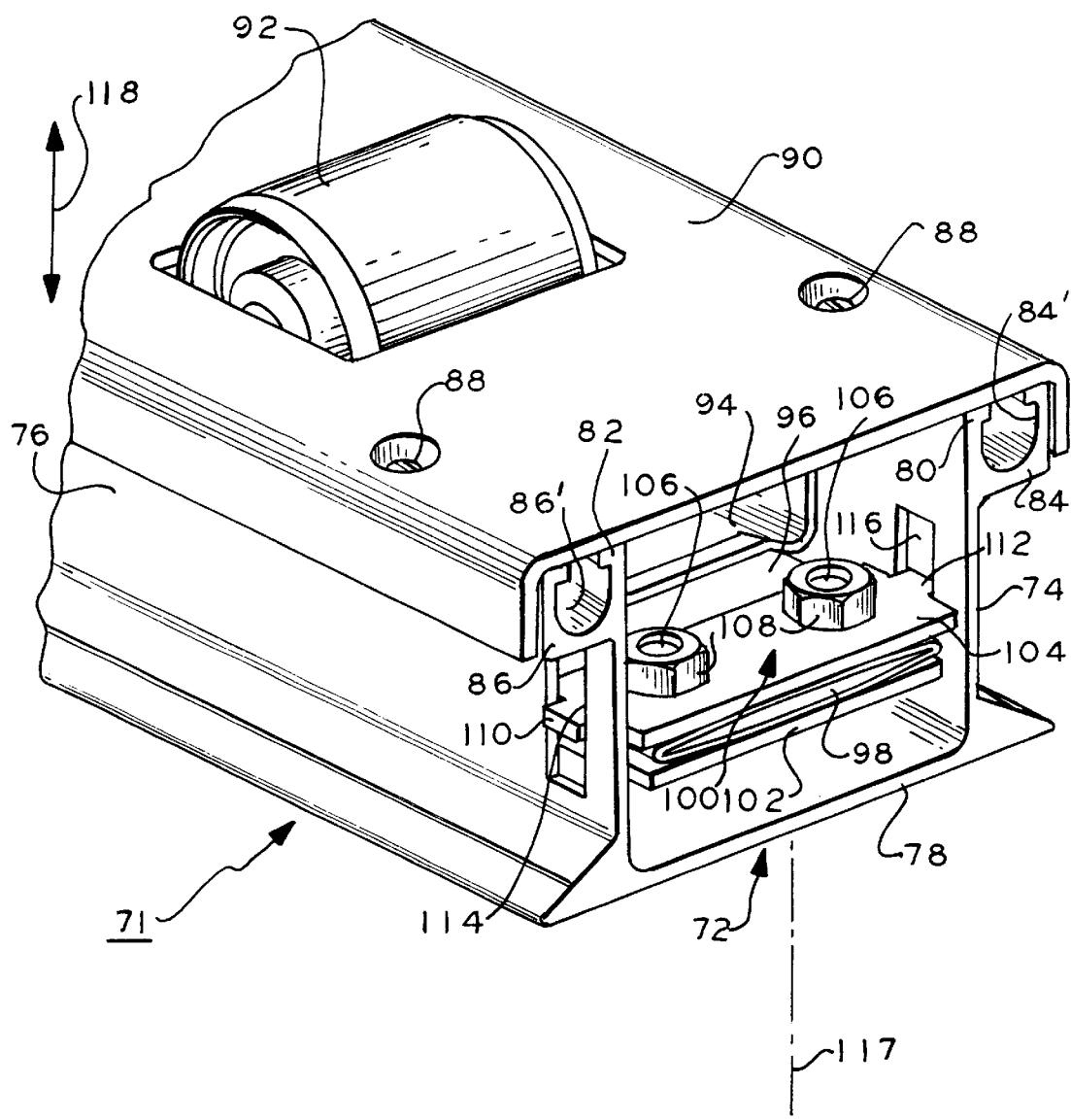
FIG. 5 is an isometric view of the track of FIG. 1 according to a second embodiment.

In FIGS. 1–3, track assembly 2 comprises a stamped metal outer channel member 4 and a stamped metal cover or top plate 6 screwed to channel member 4 with screws 8. Angle iron brackets 10 secure the channel member 4 to a floor of a cargo receiving area. In FIG. 4, a linear array of track assemblies 2 are coupled adjacent to each other to form a linear track for the mechanical transfer of cargo along a cargo receiving area. A pressurized air inlet hose 12 is coupled to a fitting 14 at the channel member 4 end of the end most track assembly of the series of tracks. The hose 12, which may be thermoplastic tubing, receives pressurized air from a source not shown. The fitting 14 is connected to the end of an elongated inflatable air bag 16, FIG. 2, by a clamp assembly 18. The air bag is relatively flat in the deflated condition of FIG. 2 and is ballooned when inflated (not shown). See the aforementioned patents incorporated by reference for more detail on such an air bag and track assembly in general. A clamp 20, FIG. 2, seals the end of the air bag opposite the clamp assembly 18. A further air hose 22 is connected to the fitting 14 for connection to a further inlet fitting 14 (not shown in the figures) of the next adjacent track assembly 2' of the array of track assemblies, FIG. 4. In this way each successive air bag is coupled to the pressurized inlet hose 12 in series.

The outer channel member 4, FIG. 3, has a bottom wall 23 and two opposing side walls 24 and 26. These walls form a channel member receptacle 28 for the air bag 16, the fitting 14, clamp assembly 18 and clamp 20 (FIG. 2). Identical mirror image flanges 30 and 32 extend outwardly from a respective conduit member 38 and 40 attached to the respective corresponding side wall 24 and 26 adjacent to the upper respective edge regions 34 and 36 of the side walls. Flange 30 extends from conduit member 38 and flange 32 extends from conduit member 40.

The conduit members 38 and 40 extend for the full length of the channel member 4, the flanges, conduit members and walls 23, 24 and 26 being integral one piece metal extrusions, e.g., aluminum. Conduit member 38 has an axially extending conduit 42 and forms a top element of side wall 24. An open channel 44 is beneath the conduit 42 and faces in a direction toward the bottom of the side wall 24 and bottom wall 23. Flange 30 extends from the bottom edge of the outer side wall 46 of the channel 44. The channel 44 is partially enclosed adjacent to the flange 30 by two opposing ribs 48 and 50 extending inwardly toward each other from the respective side walls 24 and 46. These ribs are generally triangular shaped and have a surface S normal to walls 24 and 46 from which they extend. The normal surfaces are located in the interior of the channel 44. The ribs have a second surface opposite the surface S that extends from the walls 24 and 46 inclined to these walls forming a triangular cross section rib shape. The ribs are spaced apart to form an opening therebetween that is smaller than the diameter of the air hose such as hose 22. An air hose such as hose 22 is placed in the channel 44 by temporarily compressing and deforming the hose to fit in the space between the ribs 48 and 50 during insertion into the channel 44. The edges of the ribs are rounded to preclude damage to the hose 22 during insertion. The hose 22 is inserted for the length of the channel to the extent of the length of the hose and is releasably captured in the channel 44 by ribs 48 and 50. This retains the hose for the length of the hose externally of the channel member 4 receptacle 28. This precludes vibration abrasion of the hose because the hose is restrained form vibration for its length. The ribs 48 and 50 retain the hose for its length and preclude such vibration. In addition, since the hose is substantially encased in the conduit member 40 channel 44 or 44', it is out of harms way and protected from potential damaging screw installation and drilling accompanying track installation.

Conduit member 40 has an identical channel 44' as channel 44 and which receives the hose 22 in this embodiment. The hose 22 could in the alternative be placed in channel 44. Conduit member 40 also has an upper channel 52. A top plate 8 has a lip 54 that is captured by overlying conduit member 40 lip 56. Plate 6 is screwed at its opposite edge 57 to conduit member 38 channel 42 by a nut 58 and mating screw 8 (FIG. 2). The top plate 6 has a plurality of rectangular openings 62, FIG. 2.

An inner metal stamped channel member 64 has a bottom wall 65 that rests on the bottom wall 67 of a thermoplastic (e.g., Acetal) wiping channel member 66. The side walls of the member 66 slide along the inner surfaces of the outer channel member side walls 24 and 26 in up and down reciprocal motion of the inner channel member 64 and seal the receptacle 28 containing the air bag 16. These up and down motions are in response to inflation and deflation of the air bag 16. In FIG. 3, the air bag 16 is shown spaced from the member 66 bottom wall 67 for clarity of illustration, these elements normally abutting. The inner metal channel member 64 has side walls 70.

Rotatably attached to the side walls 70 of the inner channel member 64 by bearings is a cargo support roller 68. The roller 68 moves up and down with the channel member 64 as the air bag 16 inflates and deflates. The rollers 68, FIG. 2, pass through the openings 62 in the top plate 6 when the bag is inflated and are recessed below the top place when the bag is deflated. This is described in more detail in the aforementioned patents. Except for the channels 44 and 44' and ribs 48 and 50, the remaining structures are prior art elements described in the aforementioned patents and need not be described in more detail herein.

In operation, when the air bags are inflated all of the rollers of all of the series aligned tracks are raised above the top plate 6 for conveying cargo loads thereon. When the bags are deflated the rollers become recessed and the cargo rests stationary on the plates 6. All air lines associated with each track extend along the length of that track externally of the receptacle 28 and are protected from damage during operation of the air bags.

In FIG. 5, in a second embodiment, track 71 has an extruded metal outer channel member 72. This member is different than the channel member 4 of FIG. 3. The outer channel member 72 has two side walls 74 and 76 and a bottom wall 78. At the upper edge regions 80, 82 of the respective side walls 74 and 76 there are mirror image identical conduit members 84, 86. The conduit members have identical conduits 84' and 86' for receiving nuts such as nut 58, FIG. 3. Screws 88 attach to the nuts to fasten top plate 90 to the upper edges of the channel member 72. Rollers 92 are rotatably attached to an inner channel member 94. A flattened elongated deflated air bag 96 is between the respective inner and outer channel members 94 and 72. An intermediate wiping member (not shown) may also be employed.

The end 98 of bag 96 is clamped by clamp 100. Clamp 100 comprises a flat steel or other metal bottom plate 102 and a flat steel or other metal upper plate 104. The two plates 102 and 104 are clamped together with the air bag 96 end 98 therebetween by screws 106 and nuts 108. The upper plate 104 has first and second tabs 110 and 112 extending longitudinally from the plate ends. In the alternative, the tabs may extend from the bottom plate. The channel member 72 side wall 76 has a vertically extending slot 114. The channel member 72 side wall 74 has an identical slot 116 as slot 114 and in opposing relation.

The slot 114 receives the tab 110 and the slot 116 receives the tab 112. The slots are rectangular and the tabs 110 and 112 are also rectangular. The tabs are closely received in the slots so that the tabs may move vertically in the slots without binding and tilting in the plane of the plate 104. That is the plate 104 does not rotate about a vertical axis such as axis 117, but only translates vertically in directions 118. This precludes binding of the tabs in the slots 114 and 116. The clamp 100 may tilt about a horizontal axis extending longitudinally along the length of the air bag 96.

Prior art clamps also comprise two plates sandwiching the air bag therebetween. However, they also require additional components such as a vertical post to fix the bag end in place and such a post does not permit that end to move vertically, or an air fitting which is subject to leakage due to the motions imparted by the air bag. Thus the fewer fittings the more reliable the structure. The vertical bag end motion extends the life of the bag at this end due to the stresses imposed by the inflation and deflation of the air bag.

What is claimed is:

1. A roller conveying apparatus comprising:

an outer channel member having a bottom wall and two opposing side walls forming an elongated receptacle;

a top plate secured to the outer channel member side walls for enclosing the receptacle, the top plate having a plurality of openings there through;

an inner channel member having a bottom wall and forming an elongated inner channel, the inner channel member being disposed in the receptacle;

a plurality of rollers for vertically supporting a cargo load and rotatably secured to the inner channel member in the inner channel, each roller corresponding to a roller receiving opening in the top plate;

an elongated inflatable air bag in the receptacle disposed between and for engagement with the outer channel member bottom wall and the inner channel member bottom wall, the air bag when inflated for displacing the inner channel member in a vertical direction to move the rollers through the corresponding openings and when deflated for permitting displacement of the inner channel member to recess the rollers into the inner channel member channel, the air bag having first and second opposing ends and being arranged to receive pressurized air to inflate the bag;

a clamp at one of the air bag ends for sealing the air bag at one end, the clamp for displacing in the receptacle in response to the inflation and deflation of the air bag; and guide means for guiding the clamp during the clamp displacement.

2. The apparatus of claim 1 wherein the guide means comprises cooperating means coupled to the clamp and outer channel member arranged to permit only vertical displacement of the clamp in said receptacle.

3. The apparatus of claim 1 wherein the outer channel member side walls each have a slot, said clamp comprising at least one member for fluid sealing the air bag one end, the at least one member having opposing first and second ends, said at least one member first and second ends each including a tab for engaging and mating with the slot in a corresponding different outer channel member side wall.

4. The apparatus of claim 3 wherein the slots are oriented vertically in the corresponding outer channel member side wall, said tab for traversing the mating slot vertically.

5. The apparatus of claim 1 wherein the clamp comprises a pair of plates fastened together, each plate having opposing ends and lying in a plane, the guide means including a tab extending from at least one end of at least one of the plates, at least one outer channel member side wall having a slot for receiving the tab to permit the clamp to displace vertically in response to inflation and deflation of the air bag while precluding horizontal displacement of the bag one end.

6. The apparatus of claim 1 wherein the guide means is arranged to prevent horizontal displacement of the air bag one end.

7. The apparatus of claim 1 wherein the guide means comprises matingly engaged means coupled to the clamp and outer channel member for permitting vertical displacement while precluding horizontal displacement of the air bag one end.

8. The apparatus of claim 7 wherein the guide means comprises a tab on the clamp and a mating slot for receiving the tab in a side wall of the outer channel member.

\* \* \* \* \*